Patented Mar. 16, 1954

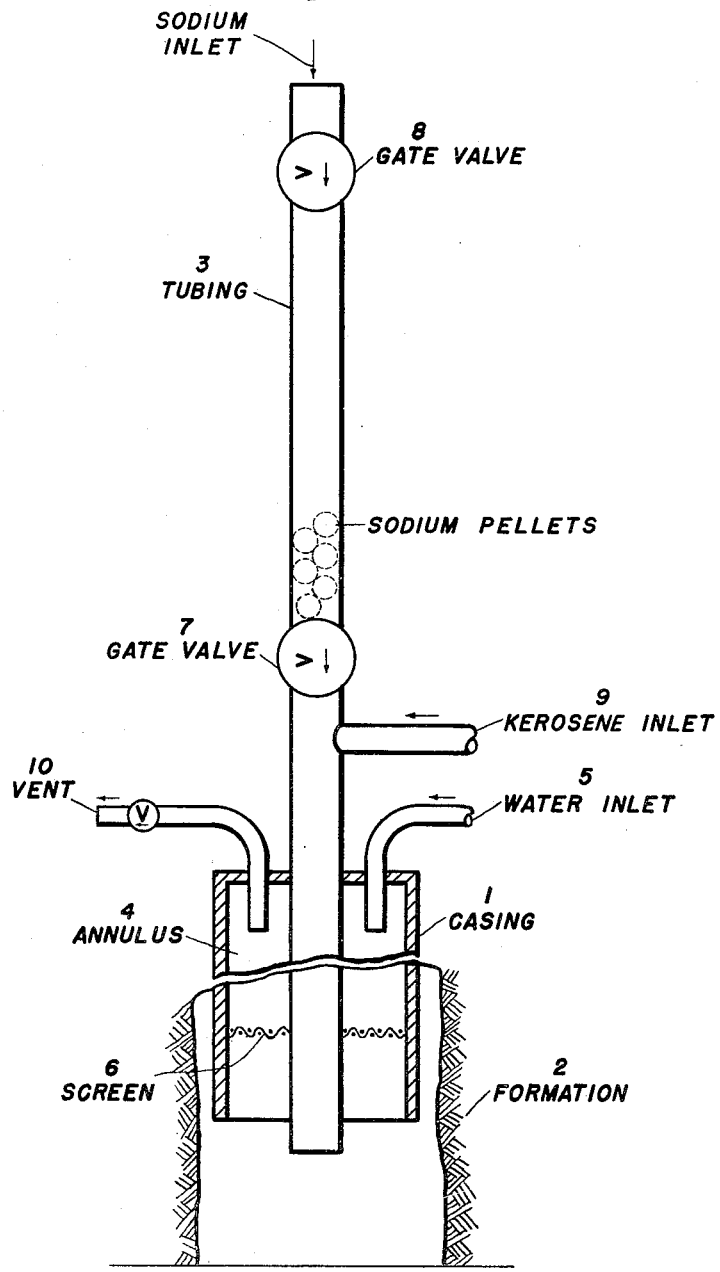

2,672,201

UNITED STATES PATENT OFFICE 2,672,201

INCREASING PRODUCTION OF OIL WELLS

Roy H. Lorenz, Elmhurst, Ill., assignor to The Pure Oil Company, Chicago, Ill., a corporation of Ohio Application August 19, 1950, Serial No. 180,435

6 Claims. (Cl. 166—24)

This invention relates to a method for improving the efficiency of oil recovery operations which may involve the direct withdrawal of oil from earth formations or secondary recovery operations wherein fluids are injected into one or more earth formations to force any remaining oil into a producing well. More particularly, the invention relates to a method of increasing the permeability of siliceous formations by treatment with alkali metal hydroxide solutions formed in situ.

The interstices of siliceous earth formations, through which oil may be caused to pass, or from which it is desired to produce oil, can be enlarged and the permeability of the formation increased by forcing heated alkali metal hydroxide solutions, preferably sodium or potassium hydroxide solutions, into the previously heated formation, allowing the alkali to attack the formation, and then flushing the reaction products therefrom. The flushing operation is generally conducted before there has been any substantial reduction in temperature of the formation—that is, below the precipitation point of the reaction products. The application of such processes has proven very effective for increasing the permeability of such formations.

Experiments have shown that the original permeability of a typical siliceous formation, namely, Berea sandstone, which was tested, is from 30 to 100 millidarcys. Alkali and silica do not react appreciably at room temperatures, such reactions taking place only at elevated temperatures. Upon treatment of such sandstone cores with alkali metal hydroxide solutions, having a concentration of from 5 per cent, by weight, to 50 per cent by weight, at temperatures of above 300° F., the permeability of the core can be increased from the values mentioned to values of from two to ten times as great. Often complete disintegration of the sandstone, especially cores cut from Berea sandstone and treated with hot alkali under pressure in the laboratory, can be attained through successive treatments, with two or more fresh alkali solutions, at temperatures of at least about 275° F.

Care must be exercised, in these causticizing operations, to see that the temperature of the sandstone is at least about 200° to 275° F., and preferably higher during the reaction, and that the temperature of the formation is not allowed to fall below about 100° F. after the completion of the reaction. The principal reason for these precautions is to accelerate the reaction and to avoid the precipitation of silicic acid reaction products within the interstices, which occurs at 100° F., or below, with a consequent plugging instead of the desired result.

The treatments, thus far described, depend for their efficiency upon maintaining elevated temperatures during all steps involved. The maintenance of these elevated temperatures, necessitates preheating the formation and maintaining large quantities of alkali metal hydroxide solution at elevated temperatures. It is seen, therefore, that such prior methods, though effective, can be cumbersome and expensive. This is obvious when it is considered that as much as 10,000 to 20,000 gallons or more of treating solution must be maintained at temperatures of about 300° F. and that large volumes of water, or steam, must be made available for the preheating steps in these prior processes.

The primary purpose of this invention is to provide a method for increasing the permeability of siliceous formations which eliminates the need for maintaining large volumes of heated solutions and large volumes of heated flushing agents. The discovery, which makes possible this primary purpose, is that by forming the alkali metal hydroxide within the formation, or adjacent thereto, enough heat is produced to maintain the necessary reaction temperatures, raise the temperature of the formation itself to the desired reaction temperature, and thus eliminate preheating as a prerequisite to efficient operation.

Accordingly, it is a fundamental object of this invention to provide a method of increasing the permeability of earth formations, without the necessity of preheating same, by the in situ production of alkali metal hydroxide in the earth formation.

It is a second object of this invention to provide a method for increasing the permeability of earth formations by establishing an inert liquid-water interface adjacent the earth formation and introducing alkali metal into the inert liquid to sink below the interface and form therein alkali metal hydroxide under optimum conditions for reacting with the formation.

It is a third object of this invention to provide a method for increasing the permeability of siliceous earth formations by forcing water into the formation and subsequently forcing comminuted free alkali metal therein to react with the water, thus producing heat and alkali metal hydroxide in sufficient concentration to promote efficient reaction of the formation and the alkali.

It is a fourth object of this invention to provide a method for causticizing siliceous formations by the in situ production of alkali metal hydroxide, heat and pressure therein under conditions optimum for disintegration of the siliceous formation.

A fifth object of this invention is to provide a method for bringing hot alkali into contact with earth formations wherein comminuted alkali metal particles protected from reacting with water under ordinary conditions are introduced into or adjacent to an earth formation and caused to react with water therein upon removal of the protection.

Other objects of this invention will become apparent as the description thereof proceeds.

The accompanying drawing portrays an arrangement of equipment which may be employed for carrying out the process of this invention.

In accordance with one embodiment of the invention, comminuted metallic sodium or potassium is introduced into a well bore in a protected form, either as a slurry in an inert fluid or with a protective coating of such a nature as to prevent the contact of the alkali metal with water under ordinary conditions but disintegratable under conditions in the well so as to react with the water present therein either adjacent to or within the formation to form alkali metal hydroxide which further reacts with the formation to increase its permeability. The size of the particles of alkali metal will depend on the mode of treatment. If it is intended to force the alkali metal into the formation then the particle size will approach comminuted form. If the intention is to react the metal with the water adjacent the formation then pellets of alkali metal of a size which can easily pass down the tubing may be used. The inert fluid, that is one inert to the alkali metal and to the well equipment, may be liquid hydrocarbons, kerosene, or liquid ammonia. The alkali metal and inert fluid may be incorporated to form a slurry, suspension or a colloidal solution. This solution may be pumped down into the well bore and adjacent to or into the formation to be treated. When the alkali metal has been thus injected, water may be forced into the formation and allowed to react with the alkali metal. Many siliceous formations will contain sufficient connate water to form the proper or desired concentration of alkali metal hydroxide without the injection of additional water.

When metallic sodium or potassium is allowed to react with an excess of water, the products are an aqueous solution of sodium or potassium hydroxide and hydrogen gas. There is also liberated a considerable amount of heat. One pound of metallic sodium, for example, when reacted with 7.8 pounds (0.93 gal.) of water, will yield nearly one gallon of 20 per cent sodium hydroxide solution, about 8 cubic feet of hydrogen gas, and enough heat to raise the temperature of the gallon of caustic solution together with 27 pounds of sandstone, from 150° F. to 400° F. Considering that from 10,000 to 20,000 gallons of 20 per cent caustic soda solution may be necessary to give reasonable increases in permeability of a given formation, this means that from 10,000 to 20,000 pounds of metallic sodium or potassium must be reacted with 78,000 to 156,000 pounds of water. The reaction of such quantities of material would yield about 80,000 cubic feet of hydrogen gas, which would serve to pressurize a closed system and stir the reactants.

In order to demonstrate the amount of heat generated by the reaction of sodium and potassium with water and to show the ratio of water and alkali metal necessary to form an operable concentration of alkali metal hydroxide, calculations were made using published data to determine the heats of reaction. The results are shown in the following table:

Table

[Heat generated by reaction between Na and K with $H_2O$.]

| No. | Type of metal used [1] | Amt. of $H_2O$ used (gals.) | Percent Caustic Resulting from Reaction | Approximate Heat of Reaction [2] | Lbs. of $SiO_2$ which can be Heated from 150° F. to 400° F. by Heat of Reaction |
|---|---|---|---|---|---|
| 1 | Na | .93 | 20 | 862 | 27 |
| 2 | Na | .46 | 40 | 862 | 43 |
| 3 | K | .93 | 20 | 1,082 | 49 |
| 4 | K | .46 | 40 | 1,082 | 61 |

[1] Calculations based on one pound of metal.
[2] (Kg. cal./lb. metal).

Referring to the table it is to be noted that the more concentrated caustic solutions will allow more of the siliceous formation to be heated for a given amount of sodium or potassium for the reason that in the formation of the more concentrated solutions there is less water to heat. In making the calculations such factors as heat of dilution, and change of specific heat or heat of reaction with the temperature and pressure were neglected, therefore, the results only approximate the actual conditions of the reactions.

Thus having described the reaction it becomes apparent that the present invention embodies any method wherein alkali metal is caused to be introduced into a well bore and reacted with water to form alkali metal hydroxide in situ. Any of the known methods of protecting the alkali metal from reacting with water until the metal is in the proximity of the formation may be used. The invention is not to be limited by the examples herein cited. The amount of alkali metal and water used should be at least sufficient to yield a hydroxide solution of about 10 per cent by weight. Should the hydrogen pressure formed be insufficient to force the reacting solution into the formation or maintain the desired pressure therein, additional hydrostatic pressure in the well tubing may be necessary to insure proper contact.

In carrying out these reactions in a well bore adjacent a siliceous formation, the actual temperature attained by the formation will depend on the rate at which the heat is transferred into the formation. That portion of the formation immediately adjacent the reaction will undoubtedly attain temperatures higher than 400° F.

For certain operations wherein it is desirable to delay the contact of the alkali metal with the water for sufficient time to enable proper placement of the reactants adjacent or into the formation, the sodium or potassium pellets or particles may be coated with a water-soluble or otherwise protecting coating. If a water-soluble coating is used it will be of sufficient thickness to protect the alkali metal from contact with water under ordinary conditions of handling at the well surface. On extended contact with water in the earth bore the coating will be dissolved or disintegrated. The heat formed from the reaction plus the heat within the formation will aid in this disintegration of the coating.

The particular coating used may be any plastic coating which is so softened by contact with water at about the temperature of the formation, 150° F. Such coatings include acrylate and methacrylate resins, cellulose acetate, etc. Another possibility is to inject the coated pellets of alkali metal, with water, into the formation and follow this with an injection of a mineral oil, to initiate the dissoluton of the plastic coating of the pellets. Water is then injected to react with those sodium pellets from which the plastic coating has been removed. As the reaction develops, more and more heat is produced and this will disintegrate the coating on more pellets until all the pellets have reacted with the water.

Reference is made to the accompanying drawing which shows one form of apparatus which may be used for the treatment of a well in accordance with one embodiment of this invention. The casing 1 extends down into the formation 2 to be treated. Within the casing is the tubing 3 which extends upwardly to allow an inlet for the alkali metal. Between casing 1 and tubing 3 is annulus 4 into which water may be forced from water inlet 5. Screen 6 is provided to prevent reacting alkali metal from being floated away from the zone of reaction. Gate valves 7 and 8 in tubing 3 provide a means of control of the incoming alkali metal. Kerosene inlet 9 connects to tubing 3 below gate valve 7. Vent 10 provides pressure control.

After a well which has been selected for a causticizing treatment is cleaned and flushed with water, connections to the well are made as shown in the drawing. With gate valve 7 closed kerosene is pumped into the tubing at a rate just sufficient to keep the tubing full at all times. Simultaneously water is pumped into the annulus 4. Gate valve 8 is opened and the section of tubing between gate valves 7 and 8 is filled with spheres of alkali metal, as for example, metallic sodium having a diameter equal to approximately ¾ the inside diameter of the tubing. Gate valve 8 is then closed and gate valve 7 is opened. Because sodium has a higher density than kerosene the spheres of sodium will fall down through the tubing until they contact the water-kerosene interface at the bottom of the tubing. The weight of the spheres of sodium above the one at the water-kerosene interface will be sufficient to push it out of the tubing into the water in the well bore. Because metallic sodium (density—0.97 20° C.) is slightly lighter than water it will be necessary to prevent its being buoyed up to the top of the well before it completely reacts. This can be done by placing a fine mesh screen 5-10 feet above the top of the zone to be causticized. The screen will trap the sodium spheres and hold them in place allowing water pumped through the annulus to react with them. The extra 5 to 10 feet of travel before reaching the zone of the formation to be treated will bring about mixing of reactants and yield a more uniform caustic solution. By controlling the relative rates of water and sodium injection the concentration of the resulting caustic solution can be controlled. The hydrogen gas formed from the water-sodium reaction will in all probability rise to the top of the well where it may be vented to the atmosphere should it cause excessive pressure in the well.

To facilitate injection of alkali metal particles in a semi-continuous manner, several lengths of tubing equipped with gate valves can be connected in parallel such that one length may be filled with alkali metal spheres while another is being emptied into the well.

In treating relatively shallow formations, all well fluid may be pumped from the well bore to facilitate the introduction of the comminuted alkali metal. After the reaction is complete and before the formation has cooled to below about 100° to 200° F., the formation is flushed with water. This treatment may be followed with acid flushing solutions comprising any acid commonly used to dissolve earth formations; thus, the hydrohalic acids, such as hydrochloric, hydrobromic, hydroiodic, and hydrofluoric can be used where the solutions formed by reaction thereof will not interfere with the process. The acid concentrations are preferably selected so that the solution thereof is sufficiently concentrated to bring into the earth formation enough acid to dissolve any acid soluble portions of the formation and neutralize the remaining alkali. For this purpose, acid solutions ranging from about 5 to 40% acid will be useful with the range from about 10 to 20% preferable. After the acid flushing operation, water injection may be continued as in a typical secondary recovery operation.

The above procedure may be modified by incorporating the comminuted alkali metal particles in a protective coating which, though water soluble, is of sufficient thickness to protect the alkali metal from the action of the water until the former is adjacent to the formation or within the formation.

While specific details of the preferred mode of operation have been given in the foregoing explanations for purposes of illustration, it is to be understood that the invention is not limited thereby but is to be taken as limited solely by the language of the appended claims.

What is claimed is:

1. The method of increasing the permeability of siliceous earth formations for the purpose of increasing the production of oil therefrom, comprising introducing finely divided free alkali metal particles into the interstices of said formation, and said alkali metal particles being coated with a water-soluble, heat decomposable plastic capable of being disintegrated in water at about 150° F., subjecting said particles to a temperature above 150° F. in the presence of water to remove said coating and thereby allow said alkali metal particles to react with water to produce in situ alkali metal hydroxide of a concentration of at least about 10 per cent by weight, said reaction producing sufficient heat to raise the temperature of the alkali metal hydroxide solution and the formation to at least about 300° F., retaining the heat and hydrogen pressure thereby formed to aid the reaction of said alkali metal hydroxide with said formation, and flushing the formation with a flushing agent before said hydroxide solution has cooled to about 100° F.

2. The method in accordance with claim 1 in which the plastic coating is selected from the group consisting of acrylate resins, methacrylate resins, and cellulose acetate.

3. The method in accordance with claim 2 in which the plastic coating is an acrylate resin.

4. The method in accordance with claim 2 in which the plastic coating is a methacrylate resin.

5. The method in accordance with claim 2 in which the plastic coating is cellulose acetate.

6. The method in accordance with claim 1 in which the application of heat is accomplished by the temperature conditions within the formation itself, said formation having a natural temperature of above about 150° F.

ROY H. LORENZ.

References Cited in the file of this patent

UNITED STATES PATENTS

| Number | Name | Date |
|---|---|---|
| 1,254,230 | Jackson | Jan. 22, 1918 |
| 1,806,499 | Ranney et al. | May 19, 1931 |
| 2,089,479 | Herbsman | Aug. 10, 1937 |
| 2,218,306 | Austerman | Oct. 15, 1940 |
| 2,386,605 | Harton et al. | Oct. 9, 1945 |

OTHER REFERENCES

Mellor: "Comprehensive Treatise on Inorganic and Theoretical Chemistry," vol. 6, pages 282 and 283, 1925.